United States Patent
Hyder et al.

[19]

[11] Patent Number: 5,868,470
[45] Date of Patent: Feb. 9, 1999

[54] RECLINER FOR AUTOMOTIVE SEAT

[75] Inventors: Marvin W. Hyder, Lowell; Robert A. Niemiec, Grand Haven, both of Mich.

[73] Assignee: Excellence Manufacturing, Inc., Grand Rapids, Mich.

[21] Appl. No.: 922,967

[22] Filed: Sep. 3, 1997

[51] Int. Cl.⁶ ........................................ B60N 2/02
[52] U.S. Cl. ................. 297/362.14; 297/362; 297/344.1
[58] Field of Search .......................... 74/89.15; 248/429; 297/362.14, 362.12, 362.11, 342, 344.1

[56] References Cited

U.S. PATENT DOCUMENTS

| | | | |
|---|---|---|---|
| 2,596,760 | 5/1952 | Bryant | 297/362.14 |
| 3,043,552 | 7/1962 | Colzutti | 248/429 |
| 4,838,511 | 6/1989 | Terada et al. | 248/429 |
| 4,981,278 | 1/1991 | Rees . | |
| 5,052,752 | 10/1991 | Robinson | 297/362.14 |
| 5,259,257 | 11/1993 | Mouri | 248/429 X |
| 5,314,158 | 5/1994 | Mouri | 248/429 |
| 5,320,413 | 6/1994 | Griswold et al. | 297/362.14 X |
| 5,344,114 | 9/1994 | Rees . | |
| 5,499,788 | 3/1996 | Rees . | |
| 5,556,165 | 9/1996 | Pickles . | |
| 5,575,531 | 11/1996 | Gauger et al. . | |
| 5,582,461 | 12/1996 | Pickles . | |

*Primary Examiner*—Milton Nelson, Jr.
*Attorney, Agent, or Firm*—Warner Norcross & Judd

[57] ABSTRACT

A recliner mechanism for an automotive seat. The recliner mechanism includes a turnbuckle-style adjustment mechanism and a linearly stationary housing. The adjustment mechanism includes a drive screw extending through the housing. In one embodiment, the drive screw includes a conventional spur gear that is engaged with an axially elongated spur gear rotatably supported within the housing. The axes of the two gears are parallel so that the drive screw spur gear can travel axially along the elongated spur gear. The elongated spur gear is operatively connected to a conventional drive assembly. In a second embodiment, the drive screw includes an axially elongated helical gear that is engaged with a conventional worm gear rotatably supported within the housing. The elongated helical gear remains engaged with the worm gear even when the drive screw travels axially within the housing. The worm gear is operatively connected to a conventional drive assembly.

30 Claims, 6 Drawing Sheets

RECLINER FOR AUTOMOTIVE SEAT

BACKGROUND OF THE INVENTION

The present invention relates to automotive seating, and more particularly to a recliner mechanism for an automotive seat.

An automotive seat assembly typically includes a seat frame mounted for forward and rearward movement on a rail mechanism. The seat frame generally includes a cushion frame and a back frame that are separately attached to the rail mechanism. If desired, the cushion frame can be mounted to the rail mechanism upon a conventional height adjustment assembly that permits adjustment of the height and/or the angle of the cushion frame.

The back frame is mounted to the rail mechanism by a recliner mechanism that permits the back frame to pivot or recline with respect to the rail mechanism and cushion frame. The recliner mechanism typically includes a rail arm attached to the rail mechanism and a back frame arm attached to the back frame. The two arms of the recliner mechanism are pivotally interconnected to permit selective adjustment of the angle between the back frame and the rail mechanism.

The angle of the recliner mechanism and consequently the seat back is controlled by a recliner control assembly that can be operated by the seat occupant. Recliner control assemblies are available in a wide variety of designs. One type of recliner control assembly includes a "turnbuckle-style" adjustment mechanism. In this design, the adjustment mechanism includes a first externally-threaded rod pivotally mounted to the rail mechanism, a second externally-threaded rod pivotally mounted to the back frame arm of the recliner mechanism, and an internally threaded drive block extending between and operatively interconnecting the two legs. The two rods are threaded in opposite directions so that rotation of the drive block causes the rods to move toward and away from each other in the same manner as a conventional turnbuckle. Movement of the rods toward and away from each other varies the overall length of the adjustment mechanism which in turn causes the back frame arm and back frame to pivot. The turnbuckle-style adjustment mechanism suffers in that the drive block moves linearly with respect to the rail mechanism during adjustment. Because the drive block moves, it is difficult to install a conventional drive system to the recliner mechanism. This is a particularly significant problem when a power drive system is desired. While it is typically possible to interconnect the moving drive block with a stationary drive motor using a flexible drive cable, the cable will move linearly with the drive block and therefore will require special packaging and design of other seat components. For example, other seat components cannot be located in the space through which the cable will travel during operation of the adjustment mechanism. Further, in some seat assemblies, the rail mechanism and/or other seat components must be slotted to accommodate the moving cable. This weakens the rail mechanism and increases the cost of manufacture of the seat assembly.

SUMMARY OF THE INVENTION

The aforementioned problems are overcome by the present invention wherein a recliner mechanism is provided with a turnbuckle-style adjustment mechanism and a linearly stationary housing. The recliner mechanism includes an externally-threaded drive screw operatively interconnecting a pair of internally-threaded tubes, one attached to the rail mechanism and the other attached to the pivotal back frame arm. Opposite ends of the drive screw are threaded in opposite directions so that rotation of the drive screw causes the tubes to move simultaneously and linearly along the drive screw toward and away from each other. A linearly stationary drive housing is fixedly attached to and extends from the fixed tube to enclose the drive gear arrangement. Because the housing is attached to the fixed tube, it does not move linearly during adjustment of the drive screw.

In one embodiment, the drive gear arrangement includes an elongated spur gear rotatably mounted within the housing and operatively interconnected with a spur gear rigidly secured to the drive screw within the housing. During operation, the drive screw spur gear is free to travel linearly along the elongated spur gear so that the drive screw and elongated spur gear remain operatively interconnected even as the drive screw moves linearly within the housing. The elongated spur gear is operatively connected to a drive motor or to a manual actuator to provide adjustment of the recliner.

In a second embodiment, the drive gear arrangement includes a worm gear rotatably mounted within the housing and operatively interconnected with an axially elongated helical gear mounted on the drive screw within the housing. During operation, the helical gear is free to travel linearly with respect to the worm gear so that the drive screw and worm gear remain operatively interconnected even as the drive screw moves linearly within the housing. The worm gear is operatively connected to a drive motor or to a manual actuator to provide adjustment of the recliner.

The present invention provides a relatively high strength recliner mechanism that is easily manufactured and assembled. In addition, the drive gear housing remains linearly stationary during operation so that the recliner mechanism is easily connected to a conventional recliner drive assembly. Because the housing is linearly stationary, other seat components do not need to be specially packaged or designed to accommodate the adjustment mechanism.

These and other objects, advantages, and features of the invention will be readily understood and appreciated by reference to the detailed description of the preferred embodiment and the drawings.

DETAILED DESCRIPTION OF THE PREFERRED EMBODIMENT

Figure 1:
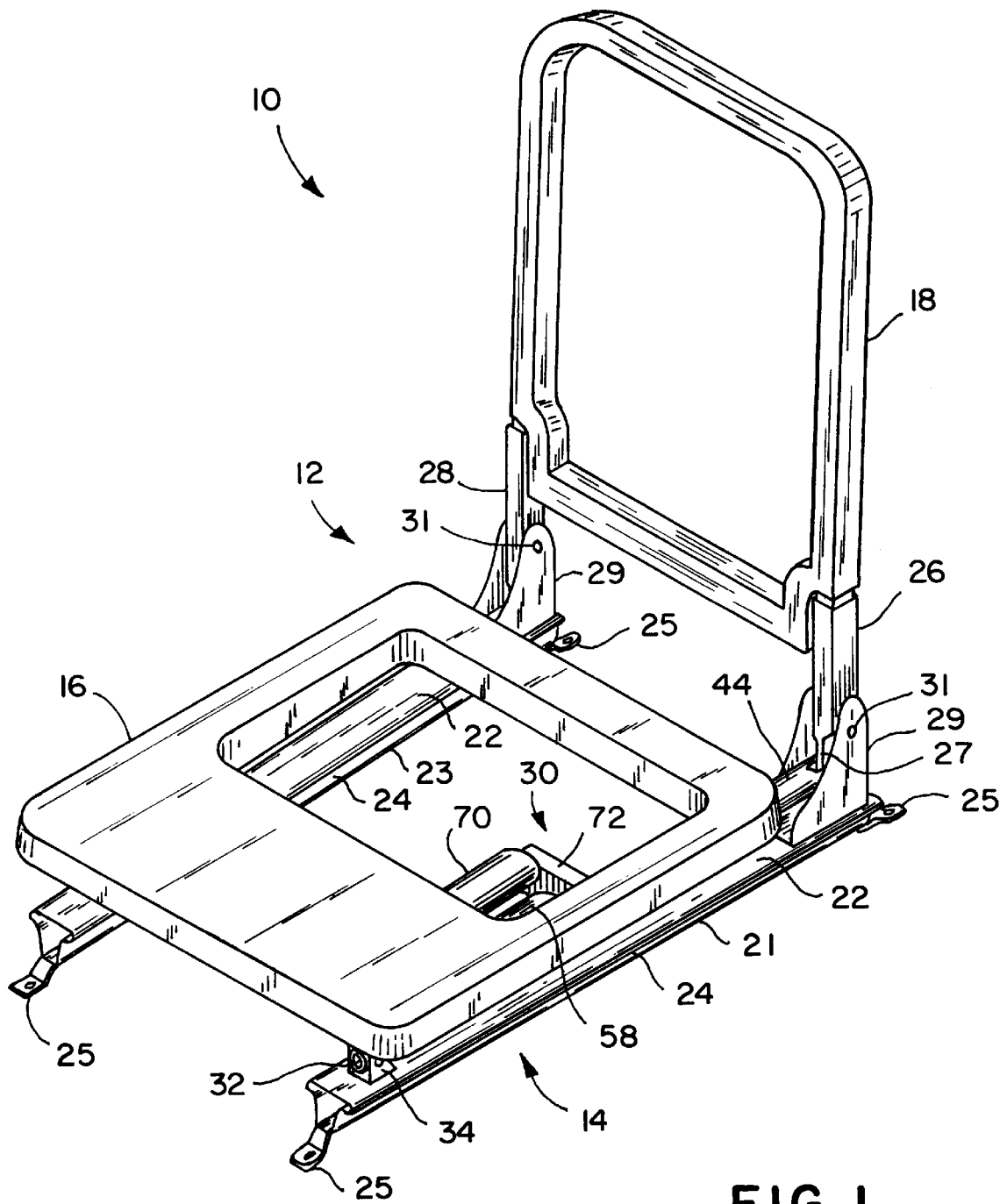
FIG. 1 is a perspective view of a seat assembly incorporating the recliner mechanism.

An automotive seat assembly incorporating a recliner mechanism according to a preferred embodiment of the present invention is illustrated in FIG. 1, and generally designated 10. The automotive seat assembly 10 is generally conventional and includes a conventional seat frame 12 mounted upon a conventional rail mechanism 14. The seat frame 12 includes a cushion frame 16 and a back frame 18 that are separately mounted to the rail mechanism 14. The back frame 18 is secured to the rail mechanism 14 by a recliner mechanism 20, which permits adjustment of the angle of the back frame 18 and consequently the seat back. With the exception of the recliner mechanism 20, the components of the seat assembly 10 are generally well known to those of ordinary skill in the art and therefore will not be described in detail. Further, the described seat assembly is merely exemplary, and one of ordinary skill in the field will recognize that the recliner mechanism 20 of the present invention is well suited for use with a variety of different seat assembly designs.

In the described embodiment, the rail mechanism 14 generally includes left and right rail assemblies 21 and 23. Each rail assembly 21 and 23 includes a pair of slidably interfitted top and bottom rails, 22 and 24 respectively. The bottom rail 24 is generally U-shaped in cross-section and is rigidly attached to the floor of the vehicle by conventional floor supports 25, and the top rail 22 is generally C-shaped in cross-section and is slidably interfitted with the upper portion of the bottom rail 24. The sliding engagement between the top and bottom rails permits the seat assembly to be selectively moved forwardly and rearwardly with respect to the floor of the vehicle.

As noted above, the seat frame 12 includes a cushion frame 16 and a back frame 18. The cushion frame 16 and back frame 18 are mounted to the top rails 22 so that the entire seat frame 12 moves forwardly and rearwardly when the top rails 22 are moved along the bottom rails 24. When an adjustable-height cushion frame 16 is not desired, the cushion frame 16 is mounted to the top rails 22 using conventional rigid brackets (not shown). However, when an adjustable-height cushion frame 16 is desired, a conventional height adjustment assembly (not shown) can be interfitted between the cushion frame 16 and the top rails 22. The height adjustment assembly can be of a manual or power design. Other optional features can be added to the seat assembly as desired, such as an adjustable lumbar support. Suitable springs, supports, cushioning, upholstery, and/or fabric is installed on the cushion frame 16 and back frame 18 to provide a finished seat.

The back frame 18 is attached to the top rails 22 through the recliner mechanism 20, which permits adjustment of the angle of the back frame 18. The recliner mechanism 20 includes a pivoting back frame arm 26 and 28 mounted to each top rail 22 to receive the back frame 18. Each back frame arm 26 and 28 is secured to the corresponding top rail 22 by a pivot bracket 29. The pivot bracket 29 is a generally U-shaped bracket that is riveted, welded or otherwise secured to the top rail 22. A pin 31 extends through the pivot bracket 29 and back frame arm 26 and 28 to pivotally secure the back frame arm 26 and 28 to the pivot bracket 29. The left rail assembly 21 includes an adjustment mechanism 30 for controlling the angle of the back frame arm 26 and consequently the seat back. The bottom end of the back frame arm 26 of the left rail assembly 21 is attached to the adjustment mechanism 30, and is crimped to form a tab 27 that is pinned or otherwise attached to the adjustment mechanism 30. The right rail assembly 23 does not include an adjustment mechanism. Instead, the back frame arm 28 of the right rail assembly 23 pivots freely in a slave relationship to the back frame arm 26 of the left rail assembly 21.

Alternatively, when additional strength is desired, the left and right rail assemblies can each include an adjustment mechanism. In such applications, the left and right adjustment mechanisms will be generally identical to adjustment mechanism 30, and both adjustment mechanisms will typically be driven by the same drive motor. For example, the left and right adjustment mechanisms can be driven by separate drive cables attached to opposite ends of a single drive motor.

Figure 2:
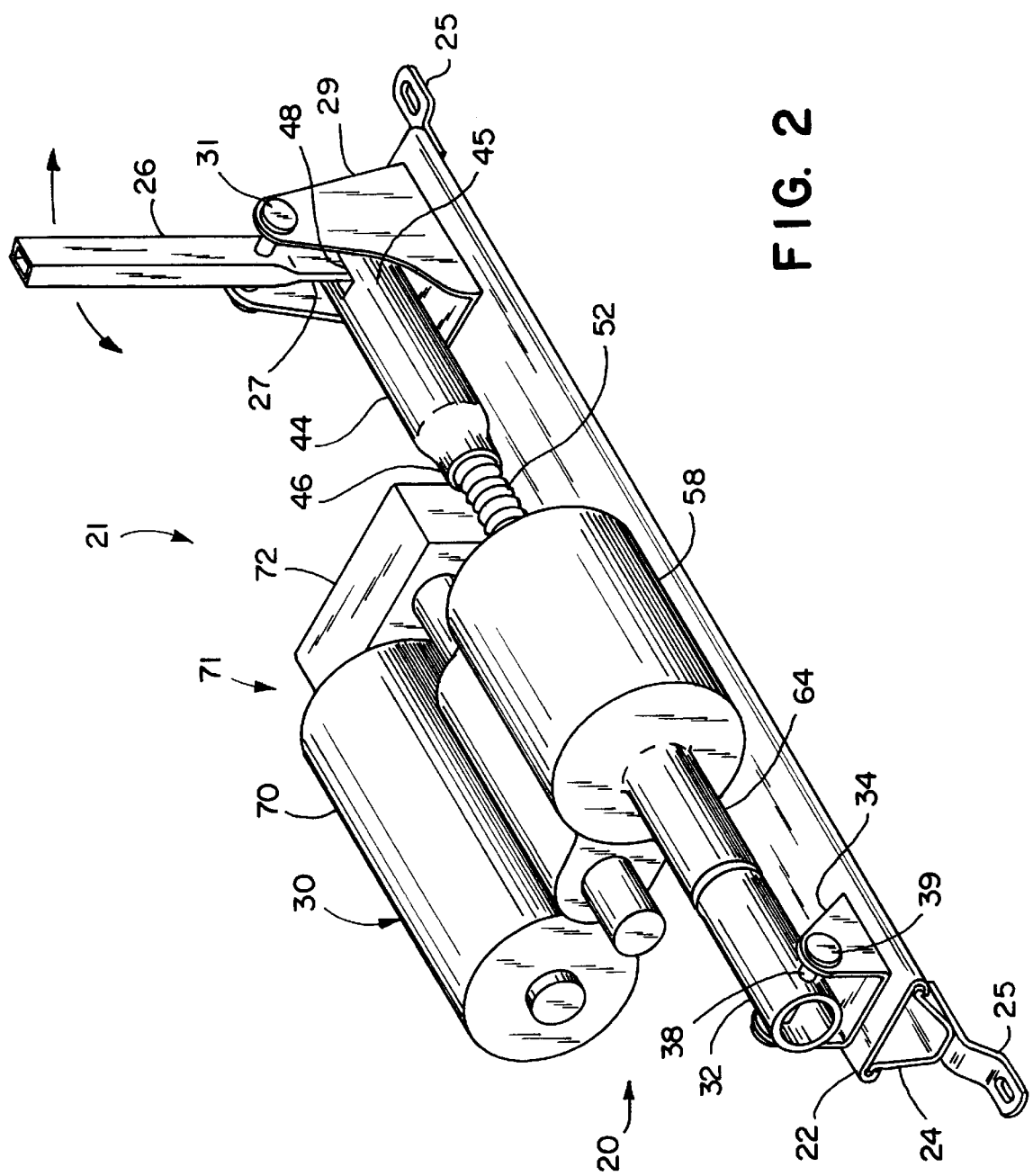
FIG. 2 is a perspective view of a portion of the seat assembly showing the adjustment mechanism.
Figure 3:
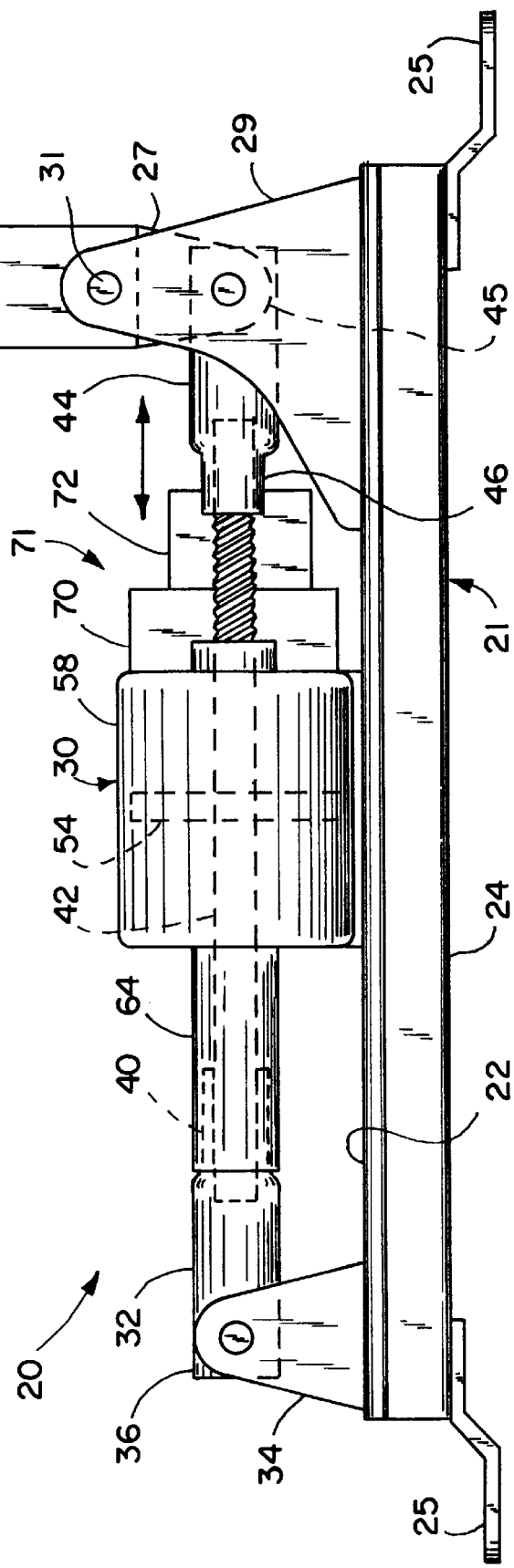
FIG. 3 is a side elevational view of the seat assembly.
Figure 4:
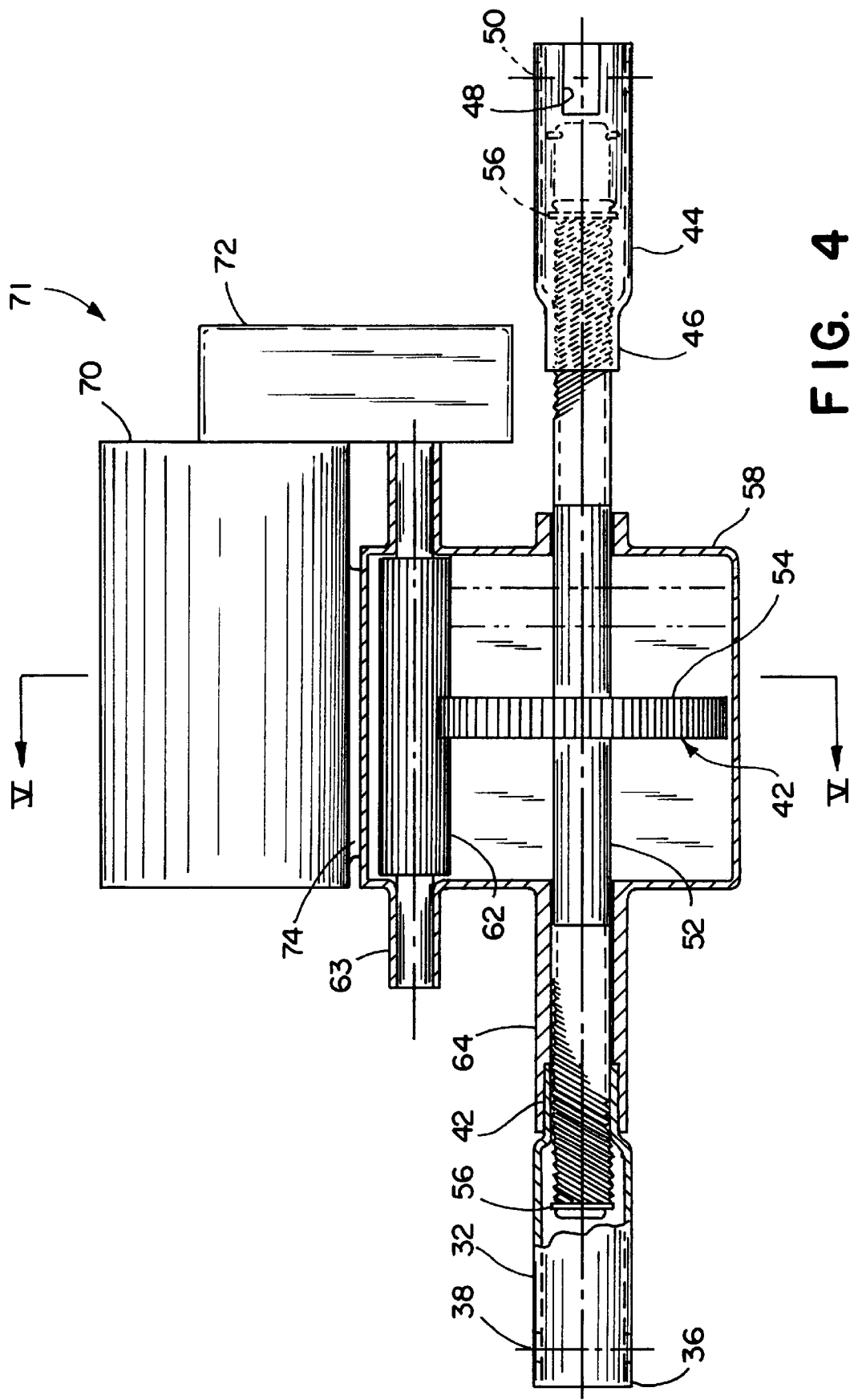
FIG. 4 is a partially sectional top plan view of the recliner mechanism.
Figure 6:
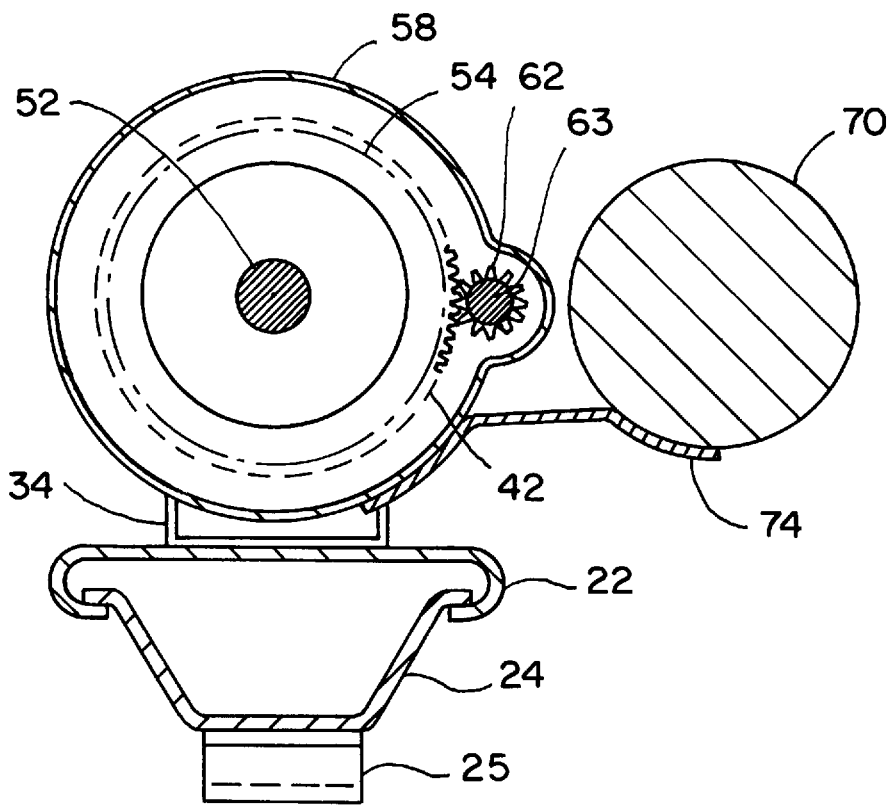
FIG. 6 is a sectional view of the recliner mechanism taken along line V—V of FIG. 4.

Referring now to FIGS. 2–4, the adjustment mechanism 30 includes a fixed tube 32 that is pivotally secured to the top rail 22 by a front bracket 34. The front bracket 34 is a generally conventional U-shaped brackets that is riveted, welded or otherwise secured to the top rail 22. The fixed tube 32 includes a first end 36 that defines a mounting hole 38 which receives a pin 39 for securing the first end 36 to the front bracket 34 and a second end 40 that is swaged and tapped to threadedly receive the drive screw 42 as described below. The recliner mechanism 20 also includes an adjustable tube 44 having a first end 45 that is secured to the bottom end of the back frame arm 26 and a second end 46 that is threadedly secured to the drive screw 42. The first end 36 defines a slot 48 that receives the tab 27 at the bottom end of the back frame arm 26 and a mounting hole 50 that receives a pin 49 for pivotally attaching the first end 46 to the tab 27. The second end 46 is swaged and tapped to threadedly receive the drive screw 42 as described below.

Figure 5:
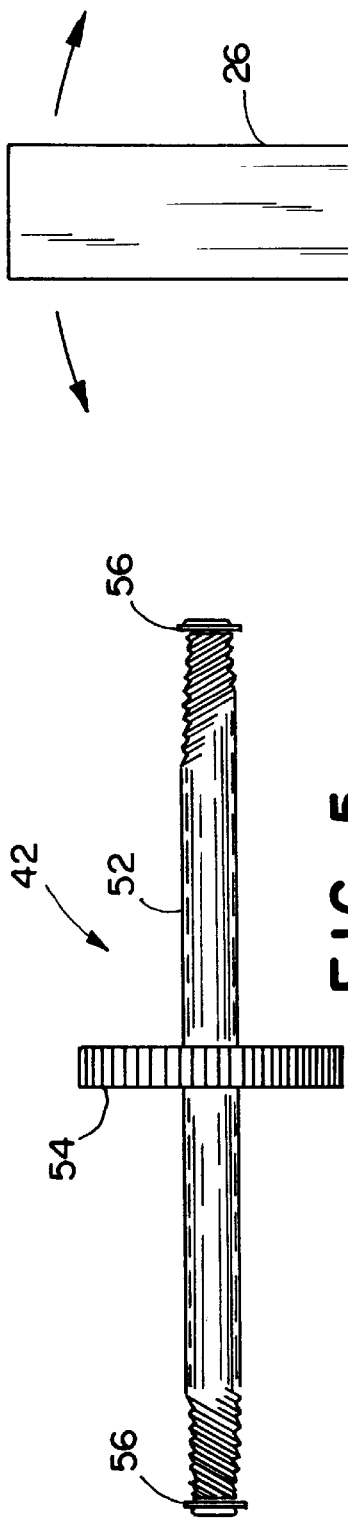
FIG. 5 is a side elevational view of the drive screw.

As shown in FIG. 5, the drive screw 42 includes a shaft 52 having a centrally located spur gear 54. The portions of the shaft 52 on opposite sides of the spur gear 54 are threaded in opposite directions so that rotation of the drive screw 42 causes the fixed tube 32 and adjustable tube 44 to simultaneously move in opposite directions along the drive screw 42. The drive screw 42 preferably includes acme or trapezoidal threads. Opposite ends of the shaft 52 are fitted with a washer 56 and mushroomed over. The washers 56 engage the swaged ends of the tubes 32 and 44 to limit movement of the drive screw 42.

The recliner mechanism 20 further includes a drive gear housing 58. The housing 58 rotatably supports an axially elongated spur gear 62 that is operatively engaged with the drive screw spur gear 54. The elongated spur gear 62 includes a shaft 63 that extends through the housing 58 along an axis that is parallel to the axis of the drive screw spur gear 54. As a result, the teeth of the drive screw spur gear 54 can travel along the teeth of the elongated spur gear 62 such that the drive screw spur gear 54 maintains engagement with the elongated spur gear 62 even when traveling in an axial direction. Opposite ends of the shaft 63 are journaled to the housing 58, and one end is adapted to interfit with a conventional gear reduction box. The length of the elongated spur gear 62 is selected so that drive screw spur gear 54 remains in engagement with the elongated spur gear 62 throughout the entire range of linear motion of the drive screw 42. The housing 58 includes a neck 64 that is fitted over and secured to the fixed tube 32. The neck portion 64 is preferably keyed to the fixed tube 32 to prevent its rotation. The overall shape and configuration of the housing 58 is selected to provide the smallest possible profile while providing sufficient room for the drive screw spur gear 54 to travel throughout its entire range of motion.

The recliner mechanism 20 includes a conventional drive assembly 71 for operating the adjustment mechanism. The drive assembly 71 includes a conventional reversible drive motor 70 and a conventional gear reduction box 72. The drive motor 70 is mounted to the housing 58 by a conventional motor bracket 74 and is operatively linked to the elongated spur gear 62 by the gear reduction box 72. The ratio of the gear reduction box 72 will vary from application to application as designated by the customer and will typically be selected from a range of conventional values. Alternatively, the drive motor 70 can be mounted to the top rail 22 or other seat component and linked to the elongated spur gear 62 by a flexible drive cable (not shown). Operation of the drive motor 70 is controlled by conventional controls, such as levers and/or switches located on the side of the seat assembly. For example, the occupant may push a lever in one direction to cause the seat back to pivot forwardly and in the opposite direction to cause the seat to pivot rearwardly.

Manufacture and Assembly

The recliner mechanism 20 is manufactured using generally conventional techniques and apparatus. The front bracket 34 and pivot brackets 29 are preferably formed using conventional stamping operations. The back frame arms 26 and 28 are manufactured from square or rectangular steel tubing. The bottom end of back frame arm 26 is crimped to form tab 27. Similarly, the fixed tube 32 and adjustment tube 44 are manufactured from steel tubing. The second end of each tube (i.e. the end connected with the drive screw 42) is swaged to form a reduced diameter portion. The reduced diameter portion is tapped with threads adapted to engage with the external threads on the drive screw 42. The drive screw 42 is formed by rigidly securing the drive screw spur gear 54 to the shaft. The shaft is formed from a length of hardened steel, and the drive screw spur gear 54 is welded or otherwise rigidly secured at the center of the shaft. Opposite ends of the shaft are threaded in opposite directions using a conventional die assembly.

The housing 58 is preferably molded in two parts from a conventional thermoplastic material. The parts of the housing 58 preferably snap together over the swaged end of the fixed tube 32. A detent (not shown) is preferably formed in the fixed tube to locate the housing 58 and prevent it from rotating. A pair of inserts, such as sintered bronze bushings, are preferably fitted into the housing 58 to rotatably support opposite ends of the elongated spur gear 62.

The recliner mechanism 20 is assembled by mounting the front bracket 34 to the front of the top rail 22 that will receive the adjustment mechanism 30, and a pivot bracket 29 to rear end of each top rail 22. The back frame arms 26 and 28 can be pinned to the pivot brackets 29 before or after the pivot brackets 29 are attached to the top rail 22. The back frame arm 26 is mounted to the pivot bracket 29 on the same top rail 22 as the front bracket 34 because it is adapted to interconnect with the adjustment mechanism 30. The rails pairs 21 and 23 are secured to the floor of the vehicle in a conventional manner using conventional floor supports 25.

Opposite ends of the drive screw 42 are threaded into the fixed tube 32 and adjustment tube 44. A washer 56 is fitted over each end of the drive screw 42 and the shaft ends are mushroomed to hold the washers 56 in place. The washers 56 interact with the swaged end of each tube to prevent the adjustment mechanism from being overextended. The first end 36 of the fixed tube 32 is then pinned to the front bracket 34 and the first end 46 of the adjustment tube 44 is pinned to the tab 27 at the bottom end of back frame arm 26.

The elongated spur gear 62 is then fitted into the housing 58, and the housing 58 is snapped into place over the adjustment mechanism 30 with the elongated spur gear 62 engaged with the drive screw spur gear 54. The housing 58 is located over a detent (not shown) in the fixed tube 32.

Alternatively, the housing 58 can be keyed to the fixed tube 32 to ensure proper alignment and prevent rotation.

The drive motor 70 is mounted to the motor bracket 74 which is in turn mounted to the housing 58. The gear reduction box 72 is mounted between the housing 58 and drive motor 70 in a conventional manner to operatively interconnect the drive motor 70 and the elongated spur gear 62. Conventional controls (not shown) are installed to permit the occupant of the seat to control operation of the drive motor 70.

In use, actuation of the appropriate control (not shown) will cause the drive motor 70 to rotate in either a clockwise or counterclockwise direction depending on whether the seat back is to pivot forwardly or rearwardly. The drive motor 70 rotates the elongated spur gear 62 via the gears and/or other linkage provided in the gear reduction box 72. The elongated spur gear 62 and drive screw spur gear 54 are meshed together so that rotation of the elongated spur gear 62 results in rotation of the drive screw spur gear 54. Rotation of the drive screw spur gear 54 in turn results in rotation of the drive screw 42. Because the drive screw shaft 52 is threadedly engaged with the fixed and adjustment tubes 32 and 44, rotation of the shaft 52 results in variation in the overall length of the adjustment mechanism 30 which causes the back frame 18 to pivot. More specifically, rotation of the drive screw 42 causes the drive screw 42 to move axially with respect to the fixed tube 32 and the adjustment tube 44 to move axially with respect to the drive screw 42. Because opposite ends of the drive screw shaft 52 are threaded in opposite directions, the net effect is that the adjustment tube 44 moves either toward or away from the fixed tube 32 an amount equal to the movement of the drive screw 42 with respect to the fixed tube 32 plus the movement of the adjustment tube 44 with respect to the drive screw 42.

It should be noted that the housing 58 is rigidly secured to the fixed tube 32 so that movement of the drive screw 42 with respect to the fixed tube 32 results in axial movement of the drive screw spur gear 54 within the housing 58. When this movement occurs, the drive screw spur gear 54 travels axially along the elongated spur gear 62. Because the axes of these gears are parallel to each other, the drive screw spur gear 54 remains engaged with the elongated spur gear 62.

Alternative Embodiment

Figure 9:
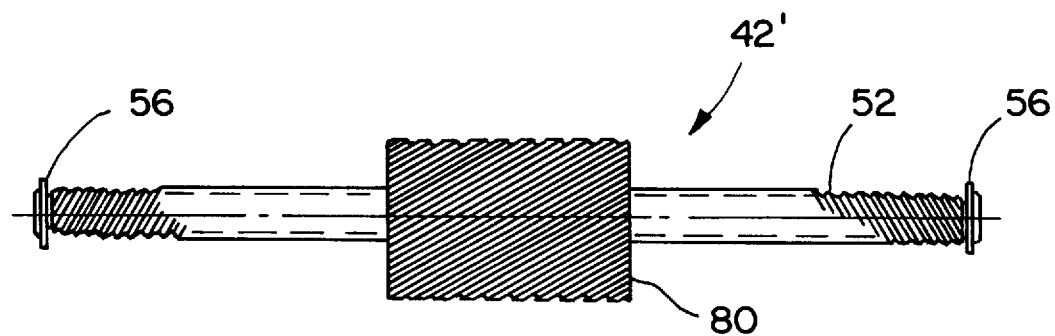
FIG. 9 is a side elevational view of the drive screw of the alternative embodiment.
Figure 7:
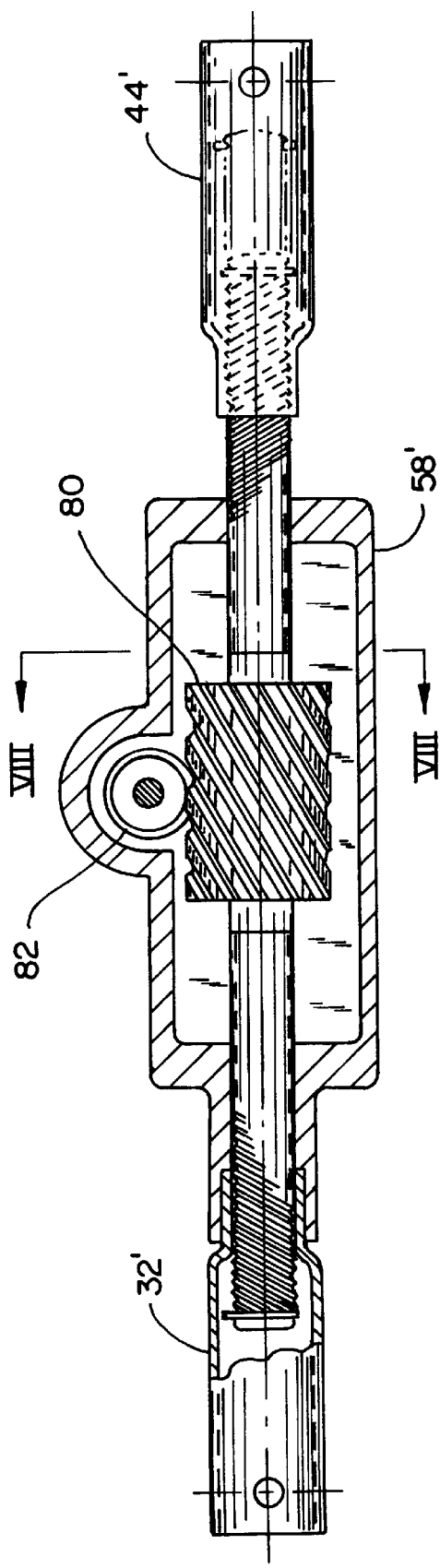
FIG. 7 is a partially sectional side elevational view of an alternative recliner mechanism.
Figure 8:
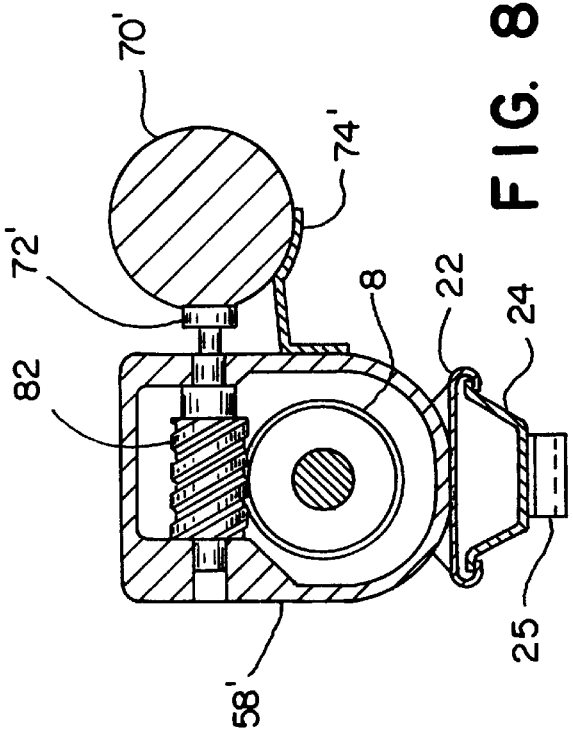
FIG. 8 is a sectional view of the alternative recliner mechanism taken along line VIII—VIII of FIG. 7.

In an alternative embodiment shown in FIGS. 7–9, the drive screw spur gear 54 is replaced by an axially elongated helical gear 80, and the elongated spur gear 62 is replaced by a conventional worm gear 82. The remaining components of the recliner mechanism 20 are essentially identical to the preferred embodiment described above.

As perhaps best shown in FIG. 7, the worm gear 82 is rotatably supported by the housing 58' immediately above and in engagement with the drive screw helical gear 80. The axis of the worm gear 82 extends perpendicular to that of the elongated helical gear 80 in the same manner as a conventional worm gear arrangement. Opposite ends of the worm gear 82 are journaled to the housing 58'. If desired, inserts, such as sintered bronze bushings can be fitted within the housing 58' to support opposite end of the worm gear 82.

As with the embodiment described above, the recliner mechanism 20 is operated by a conventional drive system including a drive motor 70' and a gear reduction box 72'. The drive motor 70' is mounted adjacent the housing 58' on a conventional motor bracket 74', and the gear reduction box 72' is mounted between the motor 70' and the housing 58' to operatively interconnect the motor 70' and the worm gear 82.

In operation, the drive motor 70' rotates the worm gear 82 which in turn rotates the helical gear 80 and the drive screw 42'. As the drive screw 42 rotates, the threaded connection between the drive screw 42' and the fixed tube 32' causes the drive screw 42' to move linearly with respect to the fixed tube 32'. Similarly, the threaded connection between the drive screw 42' and the adjustment tube 44' causes the adjustment tube 44' to move linearly with respect to the drive screw 42'. Because the ends of the drive screw 42' are threaded in opposite directions, the drive screw 42' and the adjustment tube 44' move simultaneously toward or away from the fixed tube 32' depending on the direction of rotation of the drive screw 42'.

While the disclosed embodiments describe an adjuster mechanism having an externally-threaded drive screw interconnecting a pair of internally threaded tubes, the scope of the present invention extends to various other designs. For example, the adjuster mechanism could include an internally-threaded barrel or drive block interconnecting a pair of externally-threaded screws or the adjuster mechanism could include a drive screw (or drive block) having a threaded connection at one end and a swivel connection at the other end.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. An automotive seat comprising:
    a rail mechanism;
    a seat back frame; and
    a recliner mechanism pivotally interconnecting said seat back frame to said rail mechanism, said recliner mechanism including an adjustment means for selectively controlling the angle of said seat back frame with respect to said rail mechanism, said adjustment means including a fixed portion secured to said rail mechanism and a drive portion threadedly interconnected with said fixed portion whereby rotation of said drive portion results in linear movement of said drive portion with respect to said fixed portion in a direction, said adjustment means further including a linearly stationary housing rotatably supporting a gear, said drive portion including a gear operatively engaged with said housing gear, at least one of said drive portion gear and said housing gear being extended in said direction to permit said drive portion gear and said housing gear to remain engaged when said drive portion moves with respect to said housing gear in said direction.

2. The seat of claim 1 wherein said housing gear is an axially elongated spur gear having an axis extending parallel to said direction.

3. The seat of claim 2 wherein said drive portion gear is a spur gear having an axis extending parallel to said direction, said drive portion spur gear engaged with said housing elongated spur gear.

4. The seat of claim 3 wherein said housing is fixedly secured to said fixed portion.

5. The seat of claim 4 further comprising an adjustment portion operatively interconnected with said seat back frame and threadedly interconnected with said drive portion opposite said fixed portion whereby rotation of said drive portion results in linear movement of said adjustment portion with respect to said drive portion in said direction.

6. The seat of claim 5 wherein said drive portion is further defined as a drive screw having a shaft with opposite end portions threaded in opposite directions.

7. The seat of claim 6 wherein said fixed portion is further defined as a tube having an internally threaded section threadedly engaged with said drive screw.

8. The seat of claim 7 wherein said adjustment portion is further defined as a tube having an internally threaded section threadedly engaged with said drive screw opposite said fixed portion.

9. The seat of claim 1 wherein said drive portion gear is an axially elongated helical gear having an axis extending parallel to said direction.

10. The seat of claim 9 wherein said housing gear is a worm gear having an axis extending perpendicularly to said direction, said worm gear engaged with said elongated helical gear.

11. The seat of claim 10 wherein said housing is fixedly secured to said fixed portion.

12. The seat of claim 11 further comprising an adjustment portion operatively interconnected with said seat back frame and threadedly interconnected with said drive portion opposite said fixed portion whereby rotation of said drive portion results in linear movement of said adjustment portion with respect to said drive portion in said direction.

13. The seat of claim 12 wherein said drive portion is further defined as a drive screw having a shaft with opposite end portions threaded in opposite directions.

14. The seat of claim 13 wherein said fixed portion is further defined as a tube having an internally threaded section threadedly engaged with said drive screw.

15. The seat of claim 14 wherein said adjustment portion is further defined as a tube having an internally threaded section threadedly engaged with said drive screw opposite said fixed portion.

16. An adjuster mechanism for an automotive seat recliner mechanism comprising:
    a housing rotatably supporting a gear;
    a fixed portion adapted to mount to an automotive seat rail mechanism;
    an adjustment portion adapted to mount to an automotive seat back frame;
    a drive portion extending between and interconnecting said fixed portion and said adjustment portion, said drive portion threadedly interconnected with at least one of said fixed portion and said adjustment portion whereby rotation of said drive portion results in linear movement of said drive portion in a direction, said drive portion including a gear operatively engaged with said housing gear, at least one of said drive portion gear and said housing gear being extended in said direction to permit said drive portion gear and said housing gear to remain engaged when said drive portion moves linearly in said direction.

17. The mechanism of claim 16 wherein said housing is fixedly secured to said fixed portion.

18. The mechanism of claim 17 wherein said drive portion is threadedly interconnected with said fixed portion and said adjustment portion whereby rotation of said drive portion results in linear movement of said drive portion with respect to said fixed portion in said direction and linear movement of said adjustment portion with respect to said drive portion in said direction.

19. The mechanism of claim 18 wherein said drive portion is further defined as a drive screw having a shaft with opposite end portions threaded in opposite directions.

20. The mechanism of claim 19 wherein said fixed portion is further defined as a tube having an internally threaded section threadedly engaged with said drive screw.

21. The mechanism of claim 20 wherein said adjustment portion is further defined as a tube having an internally threaded section threadedly engaged with said drive screw opposite said fixed portion.

22. The mechanism of claim 21 wherein said housing gear is an axially elongated spur gear having an axis extending parallel to said direction.

23. The mechanism of claim 22 wherein said drive portion gear is a spur gear having an axis extending parallel to said direction, said drive portion spur gear engaged with said housing elongated spur gear.

24. The mechanism of claim 21 wherein said drive portion gear is an axially elongated helical gear having an axis extending parallel to said direction.

25. The mechanism of claim 24 wherein said housing gear is a worm gear having an axis extending perpendicularly to said direction, said worm gear engaged with said elongated helical gear.

26. An automotive seat comprising:
- a rail mechanism adapted to mount to the floor of a vehicle;
- a front bracket mounted to said rail mechanism;
- a pivot bracket mounted to said rail mechanism;
- a back frame arm pivotally mounted to said pivot bracket;
- a back frame mounted to said back frame arm whereby pivotal movement of said back frame arm results in variation of an angle of said back frame;
- a fixed tube pivotally mounted to said front bracket, said fixed tube having a swaged and threaded portion;
- an adjustment tube mounted to said back frame arm, said fixed tube having a swaged and threaded portion;
- a drive screw extending between and interconnecting said fixed tube and said adjustment tube, said drive screw including a gear and a shaft having opposite ends with opposite threads, one of said ends being threadedly interfitted with said swaged and threaded portion of said fixed tube and the other of said ends being threadedly interfitted with said swaged and threaded portion of said adjustment tube, whereby rotation of said drive screw results in linear movement of said drive screw with respect to said fixed tube in a direction and linear movement of said adjustment tube with respect to said drive screw in said direction;
- a housing mounted to said fixed tube and rotatably supporting a gear engaged with said drive screw gear, at least one of said drive screw gear and said housing gear being extended in said direction to permit said drive screw gear and said housing gear to remain engaged when said drive screw moves linearly in said direction.

27. The seat of claim 26 wherein said housing gear is an axially elongated spur gear having an axis extending parallel to said direction.

28. The seat of claim 27 wherein said drive screw gear is a spur gear having an axis extending parallel to said direction, said drive screw spur gear engaged with said housing elongated spur gear.

29. The seat of claim 28 wherein said drive screw gear is an axially elongated helical gear having an axis extending parallel to said direction.

30. The seat of claim 29 wherein said housing gear is a worm gear having an axis extending perpendicularly to said direction, said worm gear engaged with said elongated helical gear.

* * * * *